May 16, 1967
H. K. FULLER
3,319,911
FISHING POLE HOLDER
Filed June 2, 1966
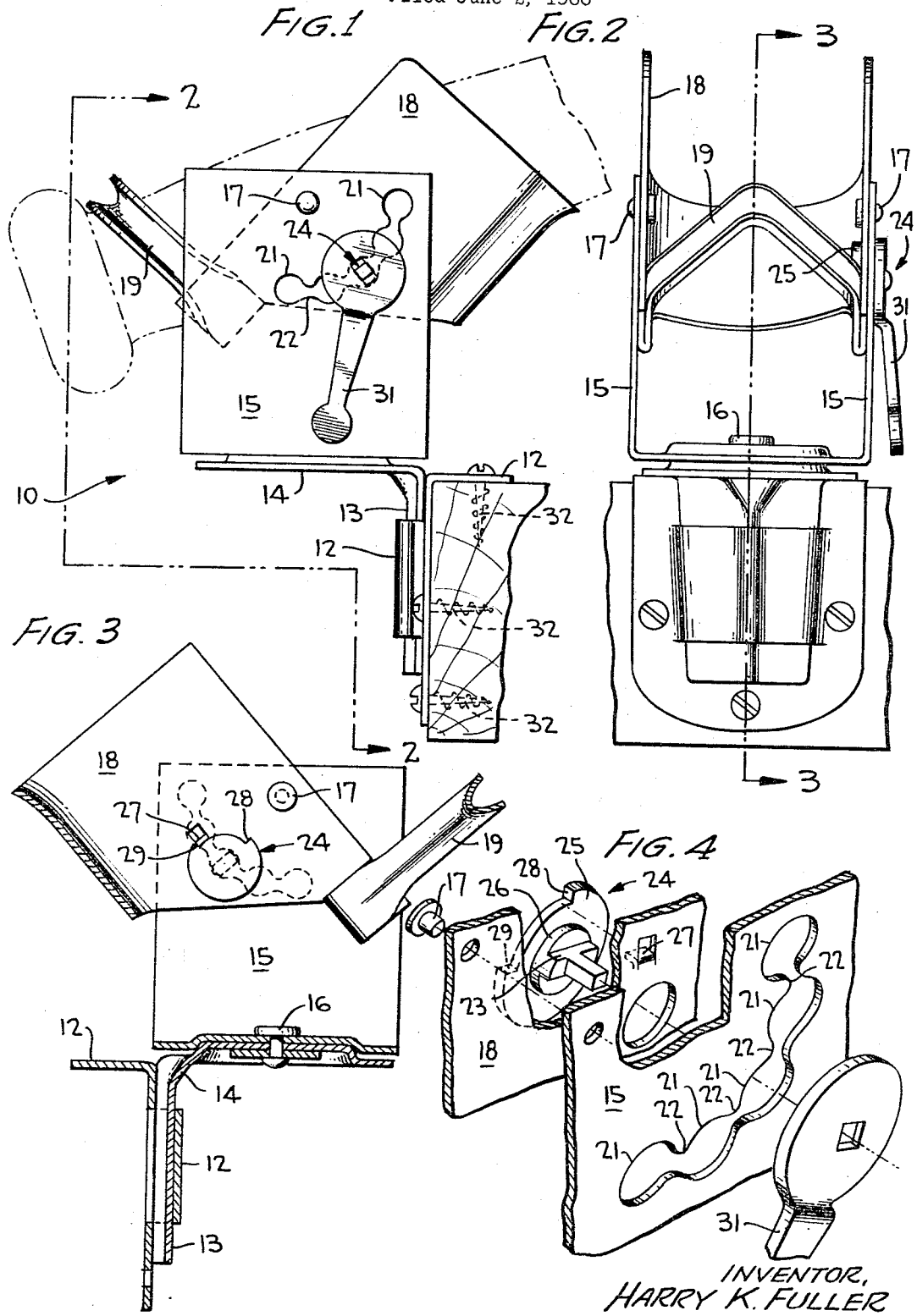
INVENTOR,
HARRY K. FULLER

United States Patent Office 3,319,911
Patented May 16, 1967

3,319,911
FISHING POLE HOLDER
Harry K. Fuller, Fairfax County, Va.
(1509 Orange St., Beaumont, Tex. 77701)
Filed June 2, 1966, Ser. No. 554,731
3 Claims. (Cl. 248—42)

This invention relates to improvements in pole supports, and more particularly, to fishing pole supports that can be adjusted in any direction.

This fishing pole holder readily holds a conventional fishing pole and is easy to use as well as being economical to produce. With this holder, the fishing pole is permitted movement about horizontal and vertical axes. Use is made of sheet metal to form the structure. A positive locking means positions the fishing rod about a horizontal axis in any one of several positions. Further, this fishing pole holder is readily mounted on a fishing vessel or a pier and, even more readily, is mounted on the earth. Moreover, prior fishing pole holders were not readily adjustable to various positions and there was a requirement for many parts to hold a fishing pole in its adjusted positions. The fishing pole holder of this invention makes use of fewer parts than the prior devices, and provides an improvement in stability as well as flexibility in use.

Accordingly, it is an object of this invention to provide a fishing pole holder which makes use of a minimum number of parts to produce a more stable holder while providing for full adjustability.

It is a further object of this invention to provide a fishing pole holder which is adjustable about two axes.

A still further object of this invention is to provide a fishing pole holder that is easily mounted on a boat or even more readily mounted on the ground.

Another object of this invention is to provide a fishing pole holder that makes use of sheet metal fabrication thereby reducing cost of manufacture.

Still another object of this invention is to provide a fishing pole holder which readily receives and secures any fishing pole in its receiving means without any manual locking means.

It is another object of this invention to provide a fishing pole holder that is compact and easily packaged in a small container.

Still another object of this invention is to provide a fishing pole holder which is exceptionally simple in its operation.

The foregoing and other objects and advantages of the invention will become apparent from a consideration of the following specification and the accompanying drawings, wherein:

FIGURE 1 shows a side view of a preferred embodiment of this invention; FIGURE 2 shows an end view of the device in FIGURE 1 as seen along line 2—2; FIGURE 3 is a sectional view of this invention as seen along line 3—3 in FIGURE 2; and FIGURE 4 is an exploded perspective view of the details of the vertical locking means of this invention.

In this invention, a mounting bracket is secured to a boat or pier. A sheet metal housing has a pivotal mounting means having a tongue ending therefrom which is inserted into the mounting means on the boat. Pivoted within the sheet metal housing means is a fishing pole holder structure with a locking means therebetween. The superior locking means to this invention enables the stability of this fishing pole holder to be exceptional.

Referring now to the embodiment shown in FIGURE 1, the fishing pole holder referred to generally by number 10 is mounted on a boat or a pier 11. A mounting bracket 12 is secured to the boat 11 and provides a slot for the reception of the tongue 13 which is integrally attached to a flange means 14. A U-shaped sheet metal support cradle means 15 has in the bight thereof a flanged section that mates with the flange means 14 having a centrally located securing means, such as rivet 16, to provide pivotal movement about a vertical axis through rivet 16 while maintaining structural stability. By the use of pivots 17, pole receiving means 18 is pivoted to support cradle means 15. Pivots 17 provide for the pivoting of the fishing pole receiver 18 about a horizontal axis. A retaining member 19 is provided at one end of the top of the fishing pole receiver means 18. The uppermost portion of retaining member 19 combines with the bight of the U-shaped fishing pole receiver 18 to hold a fishing pole therebetween. The retaining member 19 is normally at the end of the fishing pole so as to provide downward pressure thereon whereas the bight of the receiver 18 provides the upward forces. In use, it is desirable that the pivoting about the vertical be free so as to accommodate for unusual pressures applied to the fishing pole such as occur during a catch, for example. However, pivoting about the horizontal axis as at rivets 17, is desired to be stable in selected positions.

In one of the tines of support cradle means 15, a locking means is provided to secure the fishing pole receiver 18 in any one of a plurality of selected positions. With pivot means 17 as the center, a plurality of apertures 21 are provided in the tine of support cradle means 15. Connecting these apertures 21 are passages 22 which are smaller than apetures 21 and just large enough to pass key means 23 as shown in FIGURE 4 of a locking rivet 24. Locking rivet 24 has a head 25 which is inside the fishing pole receiver 18. An aperture in fishing pole receiver 18 mates with a shoulder means 26 on rivet 24 to provide pivotal movement of pivot 24 within the wall of fishing pole receiver 18. Wall 18 further has a stop means 27 which engages abutment 28 or 29 to limit the rotation of locking rivet 24 as seen in FIGURES 3 and 4. Keying means 23 is in the same plane with apertures 21 and passages 22 in the tine of support cradle means 15. To the outer end of the locking rivet 24 is connected a handle 31 which is available to the user to turn the locking rivet 24 after the selected vertical position of fishing pole receiver 18 has been achieved. Placing the keying means 23 with its larger dimension perpendicular to the passages 22 locks the fishing pole holder in the selected aperture 21 to give the selected secure vertical position to the fishing pole.

It is seen that the fishing pole holder can be secured to a boat or pier 11 by securing means such as screws 32. When it is desired that this fishing pole holder be used in the ground, tongue 13 can be of such length and the elongated bottom end thereof can be sharpened sufficiently to penetrate the ground deep enough to provide stable holding of the fishing pole. This of course would not require the use of brackets 12.

So it is seen, that any fishing pole can be inserted from the right of FIGURE 1 into the fishing pole receiver 18 and be held by retaining member 19 in any position desired by movement about pivot 16 and 17 with the locking means 24 securing the desired position about pivot 17.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description or by the illustrations in the annexed drawings, except as indicated in the here and after appended claims.

What is claimed is:
1. A fishing pole holder comprising
support cradle means (15),
means (14, 16) for pivotally mounting said support cradle means for rotation in a horizontal plane,
    a plurality of apertures (21) in said support cradle means radially disposed about said means for pivotally mounting and having
        passages (22) communicating therebetween,
pole receiving means (18) pivotally mounted on said support cradle means for movement in a vertical plane, and
locking means for selectively positioning said pole receiving means in one of a plurality of positions in a vertical plane, said locking means comprising
    key means (23),
        said key means being shaped to pass through said passages when turned in one position and to remain locked within one of said apertures in another position, and
    means (31) to position said key means within said apertures to lock said pole receiving means in one of a plurality of selectable positions with respect to said support cradle means.

2. The combination according to claim 1 comprising a retaining member (19) mounted on said pole receiving means to hold a fishing pole securely in a readily disengageable position.

3. The combination according to claim 2 wherein said means for pivotally mounting said support cradle means comprises
    flange means (14) having
        a depending tongue portion (13) which may be inserted in a mounting bracket mountable on a support structure.

References Cited by the Examiner

UNITED STATES PATENTS

| | | | |
|---|---|---|---|
| 923,596 | 6/1909 | Staples | 248—40 |
| 1,963,463 | 6/1934 | Hammer | 248—40 |
| 2,199,034 | 4/1940 | Witczak | 248—42 |
| 2,204,692 | 6/1940 | Parisio | 248—38 |
| 2,430,112 | 11/1947 | Hamre | 248—42 |
| 2,529,148 | 11/1950 | Fratt | 248—42 |
| 2,632,616 | 3/1953 | Heistand | 248—44 |
| 2,971,734 | 2/1961 | Grimes | 248—44 |
| 2,973,930 | 3/1961 | Smith | 248—40 |

CLAUDE A. LE ROY, *Primary Examiner.*